US011094333B2

(12) United States Patent
Park et al.

(10) Patent No.: US 11,094,333 B2
(45) Date of Patent: *Aug. 17, 2021

(54) DEVICE AND METHOD FOR STEREO NOISE CANCELLATION

(71) Applicant: Sogang University Research & Business Development Foundation, Seoul (KR)

(72) Inventors: Hyung Min Park, Seoul (KR); Byung Joon Cho, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/586,983

(22) Filed: Sep. 28, 2019

(65) Prior Publication Data

US 2020/0294524 A1 Sep. 17, 2020

Related U.S. Application Data

(63) Continuation-in-part of application No. 16/354,645, filed on Mar. 15, 2019.

(30) Foreign Application Priority Data

Aug. 20, 2019 (KR) ........................ 10-2019-0101737

(51) Int. Cl.
*G10L 21/02* (2013.01)
*G10L 21/0216* (2013.01)
(Continued)

(52) U.S. Cl.
CPC ...... *G10L 21/0216* (2013.01); *G10L 21/0264* (2013.01); *G10L 25/06* (2013.01); *H04R 3/04* (2013.01); *H04R 5/04* (2013.01)

(58) Field of Classification Search
CPC ....... G10K 11/17853; G10K 11/17823; G10K 2210/3028; H04M 9/082; G10L 21/0216;
(Continued)

(56) References Cited

U.S. PATENT DOCUMENTS

| | | | | |
|---|---|---|---|---|
| 9,143,862 | B2 * | 9/2015 | Li ......................... | H04M 9/082 |
| 2006/0002547 | A1 * | 1/2006 | Stokes .................. | H04M 9/082 379/406.14 |

(Continued)

FOREIGN PATENT DOCUMENTS

| | | |
|---|---|---|
| KR | 10-1133308 | 4/2012 |

OTHER PUBLICATIONS

English Specification of 10-1133308.

*Primary Examiner* — Vivian C Chin
*Assistant Examiner* — Ubachukwu A Odunukwe
(74) *Attorney, Agent, or Firm* — Antonio Ha & U.S. Patent, LLC

(57) ABSTRACT

A method of noise cancellation comprises providing a first estimated output signal based on an input signal and a first prior far-end channel filter and a second prior far-end channel filter corresponding to a prior frame, updating a first current far-end channel filter corresponding to a current frame according to the first estimated output signal and the first prior far-end channel filter, providing a second estimated output signal based on the input signal, the first current far-end channel filter, and the second prior far-end channel filter, updating a second current far-end channel filter corresponding to the current frame according to the second estimated output signal and the second prior far-end channel filter, and providing a resultant signal based on the input signal, the first current far-end channel filter, and the second current far-end channel filter.

17 Claims, 9 Drawing Sheets

(51) Int. Cl.

| | |
|---|---|
| ***G10L 21/0208*** | (2013.01) |
| ***G10L 21/0264*** | (2013.01) |
| ***G10L 21/0232*** | (2013.01) |
| ***G10L 25/06*** | (2013.01) |
| ***H04B 3/23*** | (2006.01) |
| ***H04M 9/08*** | (2006.01) |
| ***H04R 5/04*** | (2006.01) |
| ***H04R 3/04*** | (2006.01) |

(58) Field of Classification Search
CPC ..... G10L 21/0264; G10L 25/06; G10L 21/02; G10L 21/0208; G10L 2021/02082; G10L 21/0232; H04R 3/04; H04R 5/04; H04R 3/02; H04B 3/237
USPC ................................. 381/71.1, 71.11, 93, 96
See application file for complete search history.

(56) References Cited

U.S. PATENT DOCUMENTS

2008/0031469 A1* 2/2008 Haulick ................ H04M 9/082 381/73.1
2012/0063609 A1* 3/2012 Triki ........................ H04R 3/02 381/66
2014/0169568 A1* 6/2014 Li ............................ H04R 5/04 381/17

* cited by examiner

DEVICE AND METHOD FOR STEREO NOISE CANCELLATION

CROSS-REFERENCE TO RELATED APPLICATION(S)

This application claims priority under 35 U.S.C. 119 to Korean Patent Application No. 10-2019-0101737, filed on Aug. 20, 2019, and is a continuation-in-part application of U.S. patent application Ser. No. 16/354,645 filed on Mar. 15, 2019, which claims priority under 35 U.S.C. 119 to Korean Patent Application Nos. 10-2018-0100455, filed on Aug. 27, 2018, and 10-2019-0006814, filed on Jan. 18, 2019, in the Korean Intellectual Property Office, the disclosures of which are herein incorporated by reference in their entireties.

TECHNICAL FIELD

Embodiments of the disclosure relate to devices and methods for stereo noise cancellation.

DESCRIPTION OF RELATED ART

Voice may be input to a microphone and then output through a speaker. In this case, the sound output from the speaker may enter the microphone, creating noise. In a scenario case where voice is delivered to an audience through multiple speakers, a plurality of noise signals may come into the microphone. There are ongoing research efforts to remove noise due to stereo echo signals.

SUMMARY

According to an embodiment, a method of noise cancellation comprises providing a first estimated output signal based on an input signal and a first prior far-end channel filter and a second prior far-end channel filter corresponding to a prior frame, updating a first current far-end channel filter corresponding to a current frame according to the first estimated output signal and the first prior far-end channel filter, providing a second estimated output signal based on the input signal, the first current far-end channel filter, and the second prior far-end channel filter, updating a second current far-end channel filter corresponding to the current frame according to the second estimated output signal and the second prior far-end channel filter, and providing a resultant signal based on the input signal, the first current far-end channel filter, and the second current far-end channel filter.

Providing the first estimated output signal may include calculating a first correlation coefficient or a power ratio based on the first prior far-end channel filter and the second prior far-end channel filter and obtaining the first estimated output signal according to the first correlation coefficient or the power ratio.

Updating the first current far-end channel filter may include estimating a first variance based on the first estimated output signal, generating a first inverse autocorrelation matrix (IACM) calculated based on the first variance, and calculating a first forgetting factor based on the first estimated output signal.

The first variance may be determined by the first estimated output signal provided based on the first prior far-end channel filter and the second prior far-end channel filter.

Providing the second estimated output signal may include calculating a second correlation coefficient or a power ratio based on the first current far-end channel filter and the second prior far-end channel filter and obtaining the second estimated output signal according to the second correlation coefficient or the power ratio.

Updating the second current far-end channel filter may include estimating a second variance based on the second estimated output signal, generating a second IACM calculated based on the second variance, and calculating a second forgetting factor based on the second estimated output signal.

The second variance may be determined by the second estimated output signal provided based on the first current far-end channel filter and the second prior far-end channel filter.

Providing the resultant signal may include calculating a third correlation coefficient or a power ratio based on the first current far-end channel filter and the second current far-end channel filter and obtaining the resultant signal according to the third correlation coefficient or the power ratio.

According to an embodiment, a method of stereo noise cancellation comprises setting an initial value, providing a first estimated output signal based on an input signal and a first prior far-end channel filter and a second prior far-end channel filter corresponding to a prior frame, updating a first current far-end channel filter corresponding to a current frame according to the first estimated output signal and the first prior far-end channel filter, providing a second estimated output signal based on the first current far-end channel filter, the second prior far-end channel filter, and the input signal, updating a second current far-end channel filter corresponding to the current frame according to the second estimated output signal and the second prior far-end channel filter, and providing a resultant signal based on the input signal, the first current far-end channel filter, and the second current far-end channel filter.

Updating the first current far-end channel filter may include calculating a first correlation coefficient or a power ratio based on the first prior far-end channel filter and the second prior far-end channel filter, obtaining the first estimated output signal according to the first correlation coefficient or the power ratio, estimating a first variance of the first estimated output signal, and generating a first IACM calculated based on the first variance.

Updating the second current far-end channel filter may include calculating a second correlation coefficient or a power ratio based on the first current far-end channel filter and the second prior far-end channel filter, obtaining the second estimated output signal according to the second correlation coefficient or the power ratio, estimating a second variance of the second estimated output signal, and generating a second IACM calculated based on the second variance.

According to an embodiment, a device of noise cancellation comprises a first estimator configured to provide a first estimated output signal based on an input signal and a first prior far-end channel filter and a second prior far-end channel filter corresponding to a prior frame, a first filter configured to update a first current far-end channel filter corresponding to a current frame according to the first estimated output signal and the first prior far-end channel filter, a second estimator configured to provide a second estimated output signal based on the input signal, the first current far-end channel filter, and the second prior far-end channel filter, a second filter configured to update a second current far-end channel filter corresponding to the current frame according to the second estimated output signal and the second prior far-end channel filter, and an output device configured to provide a resultant signal based on the input signal, the first current far-end channel filter, and the second current far-end channel filter.

The first estimated output signal may be obtained according to a first correlation coefficient or a power ratio calculated based on the first prior far-end channel filter and the second prior far-end channel filter.

According to an embodiment, a device of stereo noise cancellation comprises an initializer configured to set an initial value, a first estimator configured to provide a first estimated output signal based on an input signal and a first prior far-end channel filter and a second prior far-end channel filter corresponding to a prior frame, a first filter configured to update a first current far-end channel filter corresponding to a current frame according to the first estimated output signal and the first prior far-end channel filter, a second estimator configured to provide a second estimated output signal based on the input signal, the first current far-end channel filter, and the second prior far-end channel filter, a second filter configured to update a second current far-end channel filter corresponding to the current frame according to the second estimated output signal and the second prior far-end channel filter, and an output device configured to provide a resultant signal based on the input signal, the first current far-end channel filter, and the second current far-end channel filter.

The second estimated output signal may be obtained according to a second correlation coefficient or a power ratio calculated based on the first current far-end channel filter and the second prior far-end channel filter.

According to an embodiment, a method of mono noise cancellation comprises providing an estimated output signal based on an input signal and a prior far-end channel filter corresponding to a prior frame, updating a current far-end channel filter corresponding to a current frame according to the estimated output signal and the prior far-end channel filter, and providing a resultant signal based on the input signal and the current far-end channel filter.

Updating the current far-end channel filter may include estimating a variance based on the estimated output signal and generating an IACM calculated based on the variance.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF EXEMPLARY EMBODIMENTS

Hereinafter, exemplary embodiments of the disclosure will be described in detail with reference to the accompanying drawings. The disclosure, however, may be modified in various different ways, and should not be construed as limited to the embodiments set forth herein. For example, although the description of embodiments of the disclosure focuses primarily on implementations or applications to mono- and stereo-channel structures, embodiments of the disclosure are not limited thereto but may also be applicable to three-channel or other multi-channel structures. The same reference denotations may be used to refer to the same or substantially the same elements throughout the specification and the drawings. As used herein, the singular forms “a,” “an,” and “the” are intended to include the plural forms as well, unless the context clearly indicates otherwise. It will be understood that when an element or layer is referred to as being “on,” “connected to,” “coupled to,” or “adjacent to” another element or layer, it can be directly on, connected, coupled, or adjacent to the other element or layer, or intervening elements or layers may be present.

Figure 1:
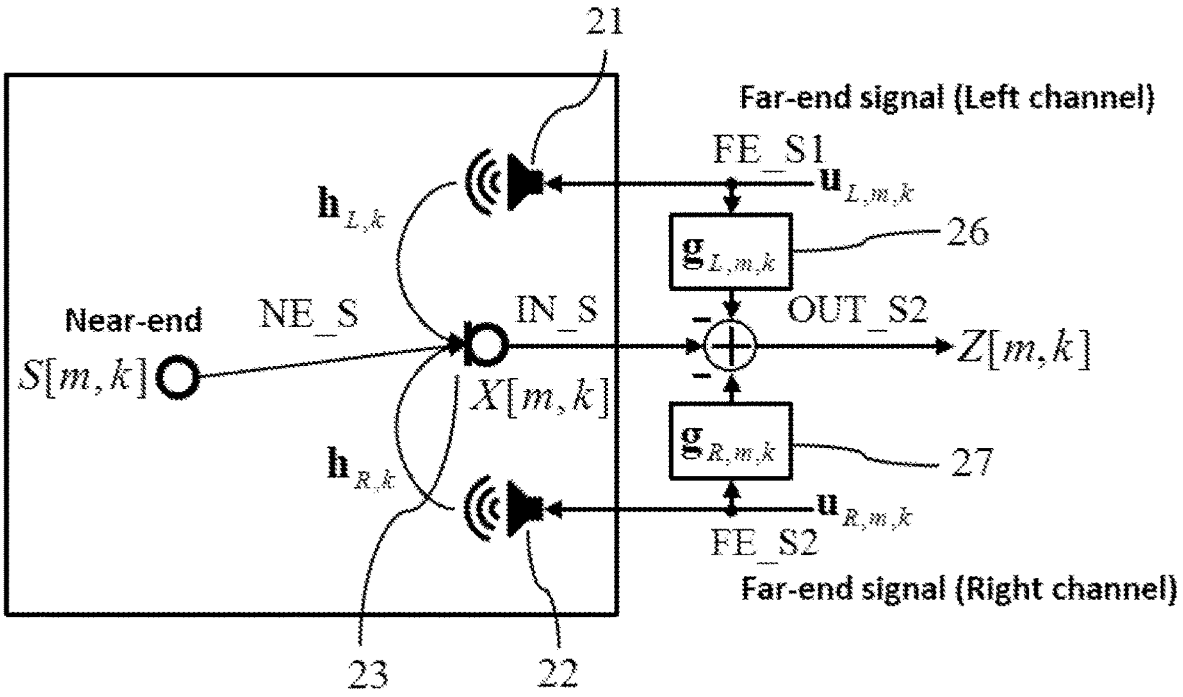
FIG. 1 is a view illustrating an embodiment of the disclosure.
Figure 2:
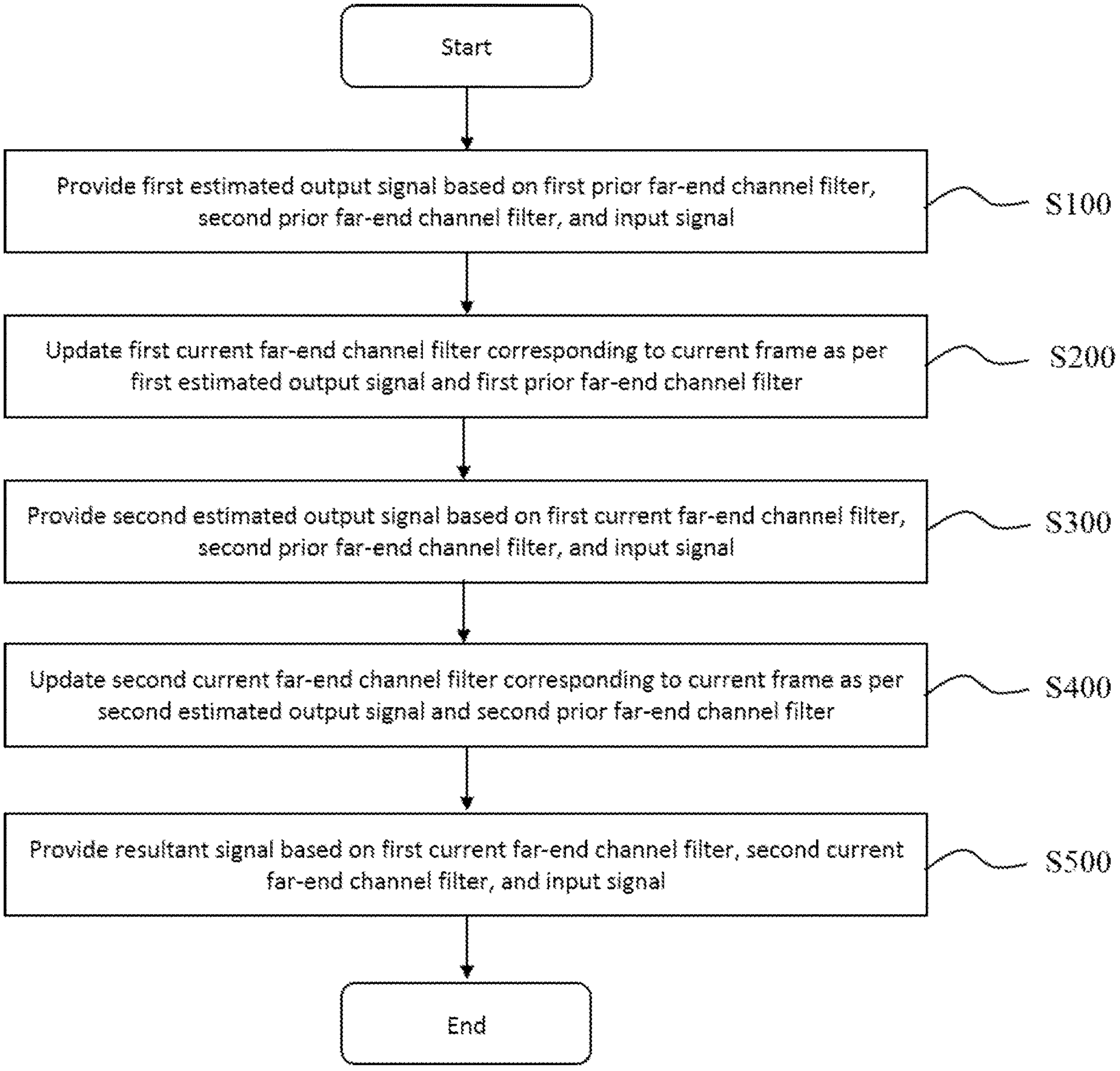
FIG. 2 is a flowchart illustrating a noise cancellation method according to an embodiment.

FIG. 1 is a view illustrating an embodiment of the disclosure. FIG. 2 is a flowchart illustrating a noise cancellation method according to an embodiment.

Referring to FIGS. 1 and 2, according to an embodiment, a noise cancellation method may provide a first estimated output signal EO_S1 based on a first prior far-end channel filter PFE_F1 (e.g., the one designated with reference number 26) and a second prior far-end channel filter PFE_F2 (e.g., the one designated with reference number 27) corresponding to a prior frame PF, and an input signal IN_S (S100). The input signal IN_S may include a near-end signal NE_S, the first far-end signal FE_S1, and a second far-end signal FE_S2.

The near-end signal NE_S may be a signal from a sound source, e.g., a user, and may also be expressed as S[m,k]. The first far-end signal FE_S1 may be a signal output from the speaker 21 and may also be expressed as $u_{L,m,k}$. The first far-end signal FE_S1 may be convoluted with an impulse response $h_{L,k}$ for an acoustic path, e.g., air, and be then input to a microphone 23. The second far-end signal FE_S2 may be a signal output from the speaker 22 and may also be expressed as $u_{R,m,k}$. The second far-end signal FE_S2 may be convoluted with an impulse response hR,k for an acoustic path, e.g., air, and be then input to the microphone 23. The input signal IN_S may also be expressed as X[m,k] where m is the frame index, and k is the frequency index. The input signal X[m,k] may be expressed as the sum of S[m,k], $h_{L,k}*u_{L,m,k}$, and $h_{R,k}*u_{R,m,k}$. By removing the last two terms, i.e., $h_{L,k}*u_{L,m,k}$, and $h_{R,k}*u_{R,m,k}$, which are noise signals, from the input signal X[m,k], the desired signal, i.e., S[m,k], may be obtained.

For analysis or processing according to the present invention, a signal may be sectioned or partitioned into a plurality of frames. For example, the analysis or processing of the input signal IN_S, the far-end signals FE_S1 and FE_S2, near-end signal NE_S, and the resultant signal OUT_S may be carried out per frame.

For example, the near-end signal NE_S may be a pure voice signal free from stereo echo signals (e.g., FE_S1 and FE_S2). The first far-end signal FE_S1 may be an echo signal provided from a first sound source 21, e.g., a speaker, disposed on a first side of a microphone 23. The first side may be a left side of the microphone 23. The second far-end signal FE_S2 may be an echo signal provided from a second sound source 22, e.g., a speaker, disposed on a second side of the microphone 23. The second side may be a right side of the microphone 23.

For example, a second frame may be provided after a first frame. Where the second frame is a current frame CF, the first frame may be the prior frame PF. In this case, the first prior far-end channel filter PFE_F1 may be a far-end channel filter on the first side of the first frame. The second prior far-end channel filter PFE_F2 may be a far-end channel filter on the second side of the first frame.

The first estimated output signal EO_S1 may be expressed as $\overline{Y}$[m,k] and be represented as shown in Equation 1.

$$\overline{Y}[m,k]=X[m,k]-g_{L,m-1,k}{}^{H}u_{L,m,k}-g_{R,m-1,k}{}^{H}u_{R,m,k}+\tfrac{1}{2}\overline{\rho}[m,k](g_{L,m-1,k}{}^{H}u_{L,m,k}+g_{R,m-1,k}{}^{H}u_{R,m,k})$$

$$u_{L,m,k}=[u_L[m,k],u_L[m-1,k],\ldots,u_L[m-M+1,k]]^T$$

$$u_{R,m,k}=[u_R[m,k],u_R[m-1,k],\ldots,u_R[m-M+1,k]]^T$$

$$g_{L,m-1,k}=[G_L{}^{(m-1)}[0,k],\ldots,G_L{}^{(m-1)}[M-1,l]]^T$$

$$g_{R,m-1,k}=[G_R{}^{(m-1)}[0,k],\ldots,G_R{}^{(m-1)}[M-1,k]]^T \quad \text{[Equation 1]}$$

Here, X[m,k] may denote the input signal IN_S, $g_{L,m-1,k}{}^{H}$ may denote the first prior far-end channel filter PFE_F1, $G_L{}^{(m-1)}$ may denote the first far-end channel filter coefficient, $u_{L,m,k}$ may denote the first far-end signal FE_S1, $h_{R,m-1,k}{}^{H}$ may denote the second prior far-end channel filter PFE_F2, $G_R{}^{(m-1)}$ may denote the second prior far-end channel filter coefficient, $u_{R,m,k}$ may denote the second far-end signal FE_S2, $\overline{\rho}$[m,k] may denote the first correlation coefficient or power ratio, M may denote the filter length, m may denote the frame index, and k may denote the frequency index.

A first current far-end channel filter CFE_F1 (e.g., the one designated with reference number 26 in FIG. 1) corresponding to the current frame CF may be updated according to the first estimated output signal EO_S1 and the first prior far-end channel filter PFE_F1 (S200).

For example, the second frame may be provided after the first frame. Where the second frame is the current frame CF, the first frame may be the prior frame PF. In this case, the first current far-end channel filter CFE_F1 may be a far-end channel filter on the first side of the second frame.

The first current far-end channel filter CFE_F1 may be expressed as $g_{L,m,k}$ and be represented as shown in Equation 2.

$$g_{L,m,k}=g_{L,m-1,k}+k_{L,m,k}\overline{Y}^{*}[m,k]$$

$$g_{L,m,k}=[G_L{}^{(m)}[0,k],\ldots,G_L{}^{(m)}[M-1,k]]^T \quad \text{[Equation 2]}$$

Here, $g_{L,m,k}$ may denote the first current far-end channel filter CFE_F1, $G_L{}^{(m)}$ may denote the first current far-end channel filter coefficient, $g_{L,m-1,k}$ may denote the first prior far-end channel filter PFE_F1, and $k_{L,m,k}$ may denote the first Kalman gain.

A second estimated output signal EO_S2 may be obtained and provided based on the first current far-end channel filter CFE_F1, the second prior far-end channel filter PFE_F2, and the input signal IN_S (S300).

The second estimated output signal EO_S2 may be expressed as $\tilde{Y}$[m,k] and be represented as shown in Equation 3.

$$\tilde{Y}[m,k]=X[m,k]-g_{L,m,k}{}^{H}u_{L,m,k}-g_{R,m,k}{}^{H}u_{R,m,k}+\tfrac{1}{2}\tilde{\rho}[m,k](g_{L,m,k}{}^{H}u_{L,m,k}+g_{R,m-1,k}{}^{H}u_{R,m,k}) \quad \text{[Equation 3]}$$

Here, X[m,k] may denote the input signal IN_S, $g_{L,m-1,k}{}^{H}$ may denote the first prior far-end channel filter PFE_F1, $u_{L,m,k}$ may denote the first far-end signal FE_S1, $g_{R,m-1,k}{}^{H}$ may denote the second prior far-end channel filter PFE_F2, $u_{R,m,k}$ may denote the second far-end signal FE_S2, $\tilde{\rho}$[m,k] may denote the second correlation coefficient or power ratio, m may denote the frame index, and k may denote the frequency index.

A second current far-end channel filter CFE_F2 (e.g., the one designated with reference number 27 in FIG. 1) corresponding to the current frame CF may be updated according to the second estimated output signal EO_S2 and the second prior far-end channel filter PFE_F2 (S400).

For example, a second frame may be provided after the first frame. Where the second frame is the current frame CF, the first frame may be the prior frame PF. In this case, the second current far-end channel filter CFE_F2 may be a far-end channel filter on the second side of the second frame.

The second current far-end channel filter CFE_F2 may be expressed as $g_{R,m,k}$ and be represented as shown in Equation 4.

$$g_{R,m,k}=g_{R,m-1,k}+k_{R,m,k}\tilde{Y}\cdot[m,k]$$

$$g_{R,m,k}=[G_R{}^{(m)}[0,k],\ldots,G_R{}^{(m)}[M-1,k]]^T \quad \text{[Equation 4]}$$

Here, $g_{R,m,k}$ may denote the second current far-end channel filter CFE_F2, $G_R{}^{(m)}$ may denote the first current far-end channel filter coefficient, $g_{R,m-1,k}$ may denote the second prior far-end channel filter PFE_F2, and $k_{R,m,k}$ may denote the second Kalman gain.

A resultant signal OUT_S may be obtained and provided based on the first current far-end channel filter CFE_F1, the second current far-end channel filter CFE_F2, and the input signal IN_S (S500).

The resultant signal OUT_S may be expressed as Z[m,k] and be represented as shown in Equation 5.

$$Z[m,k]=X[m,k]-g_{L,m,k}{}^{H}u_{L,m,k}-g_{R,m,k}{}^{H}u_{R,m,k}+\tfrac{1}{2}\rho[m,k](g_{L,m,k}{}^{H}u_{L,m,k}+g_{R,m,k}{}^{H}u_{R,m,k}) \quad \text{[Equation 5]}$$

Here, X[m,k] may denote the input signal IN_S, $g_{L,m,k}{}^{H}$ may denote the first current far-end channel filter CFE_F1, $u_{L,m,k}$ may denote the first far-end signal FE_S1, $h_{R,m,k}{}^{H}$ may denote the second current far-end channel filter CFE_F2, $u_{R,m,k}$ may denote the second far-end signal FE_S2, ρ[m,k] may denote the third correlation coefficient or power ratio, m may denote the frame index, and k may denote the frequency index.

According to an embodiment, the noise cancellation method may remove stereo echo signals from the input signal IN_S, providing noise-free voice signals.

Although examples of removing stereo echo signals are shown and described herein, embodiments of the disclosure are not limited thereto but may also be applicable to removal of mono echo signals.

Figure 3:
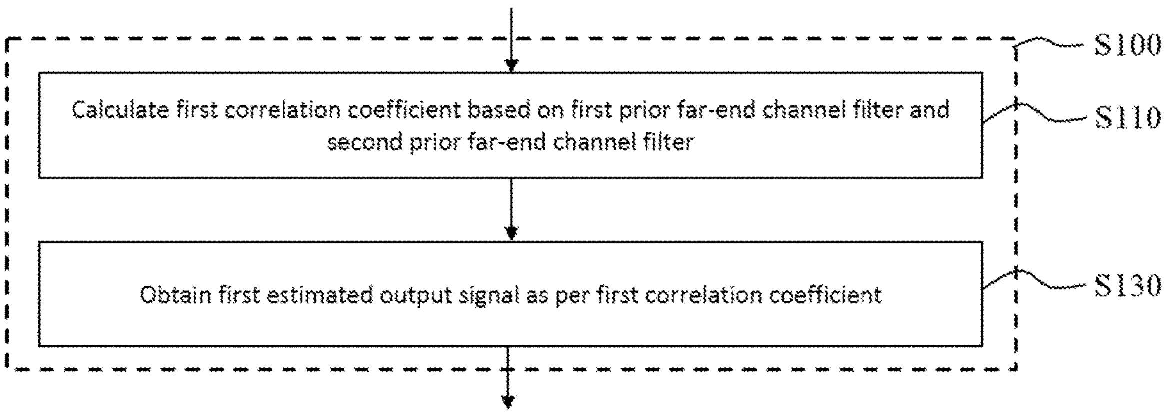
FIG. 3 is a flowchart illustrating an example of providing a first estimated output signal according to an embodiment.

FIG. 3 is a flowchart illustrating an example of providing a first estimated output signal according to an embodiment.

Referring to FIG. 3, providing a first estimated output signal EO_S1 may include calculating a first correlation coefficient or power ratio based on a first prior far-end channel filter PFE_F1 and a second prior far-end channel filter PFE_F2 (S110).

The first correlation coefficient or power ratio may be expressed as $\bar{\rho}$[m,k] and be represented as shown in Equation 6.

[Equation 6]

$$\bar{\rho}[m,k] = \frac{|\Phi_{LR}[m,k]|}{\sqrt{\Phi_L[m,k]\Phi_R[m,k]}}$$

$$\Phi_L[m,k] = \alpha_\phi\Phi_L[m-1,k] + (1-\alpha_\phi)(g^H_{L,m-1,k}u_{L,m,k})^H(g^H_{L,m-1,k}u_{L,m,k})$$

$$\Phi_R[m,k] = \alpha_\phi\Phi_R[m-1,k] + (1-\alpha_\phi)(g^H_{R,m-1,k}u_{R,m,k})^H(g^H_{R,m-1,k}u_{R,m,k})$$

$$\Phi_{LR}[m,k] = \alpha_\phi\Phi_{LR}[m-1,k] + (1-\alpha_\phi)(g^H_{L,m-1,k}u_{L,m,k})^H(g^H_{R,m-1,k}u_{R,m,k})$$

$$\bar{\rho}[m,k] = \frac{2|\Phi_{LR}[m,k]|}{\Phi_L[m,k]+\Phi_R[m,k]}$$

$g_{L,m-1,k}{}^H$ may denote the first prior far-end channel filter PFE_F1, $u_{L,m,k}$ may denote the first far-end signal FE_S1, $g_{R,m-1,k}{}^H$ may denote the second prior far-end channel filter PFE_F2, $u_{R,m,k}$ may denote the second far-end signal FE_S2, $\alpha_0$ may denote a first weight, m may denote the frame index, and k may denote the frequency index.

A first estimated output signal EO_S1 may be calculated according to the first correlation coefficient or power ratio (S130). For example, the first estimated output signal EO_S1 may be represented as shown in Equation 1.

Figure 4:
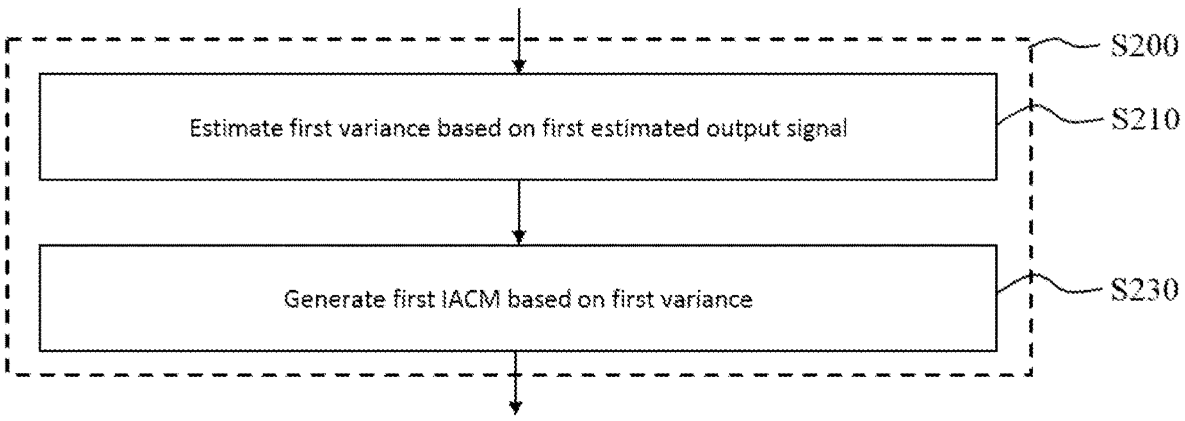
FIG. 4 is a flowchart illustrating an example of updating a first current far-end channel filter according to an embodiment.
Figure 5:
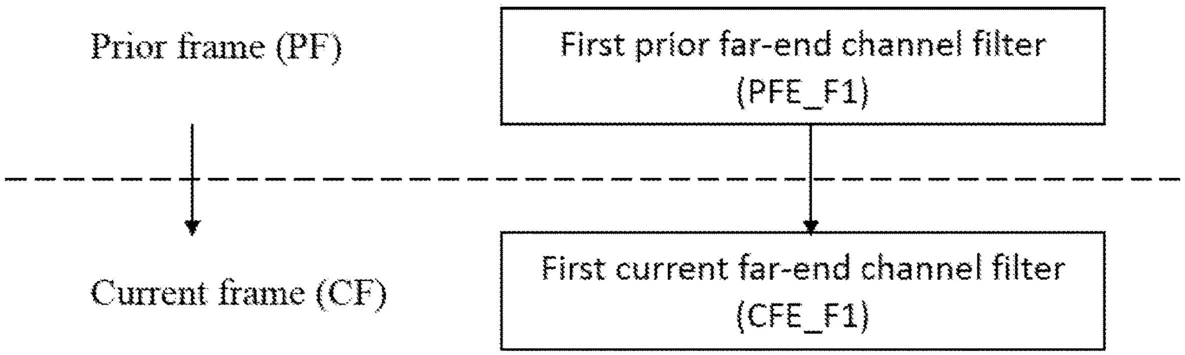
FIG. 5 is a view illustrating a first far-end channel filter varying according to frames.
Figure 6:
FIG. 6 is a view illustrating a first far-end channel filter according to an embodiment.

FIG. 4 is a flowchart illustrating an example of updating a first current far-end channel filter according to an embodiment. FIG. 5 is a view illustrating a first far-end channel filter varying according to frames. FIG. 6 is a view illustrating a first far-end channel filter according to an embodiment.

Referring to FIGS. 4 to 6, updating the first current far-end channel filter CFE_F1 may include estimating a first variance VAR1 based on the first estimated output signal EO_S1 (S210).

For example, the first variance VAR1 may be $\bar{\lambda}_Z$[m,k] and may be represented as shown in Equation 7.

$$\bar{\lambda}_Z[m,k]=w_Z\hat{\lambda}_{DD}[m,k]+(1-w_Z)|\bar{Y}[m,k]|^2 \quad \text{[Equation 7]}$$

Here, $\hat{\lambda}_{DD}$[m,k] may denote an estimated variance calculated by a decision-directed (DD) method, $w_Z$ may denote a second weight arbitrarily determined, and $\bar{Y}$[m,k] may denote the first estimated output signal EO_S1.

According to an embodiment, the first variance VAR1 may be determined by the first estimated output signal EO_S1 provided based on the first prior far-end channel filter PFE_F1 and the second prior far-end channel filter PFE_F2.

A first inverse autocorrelation matrix IACM1 may be yielded based on the first variance VAR1 (S230).

For example, the first inverse autocorrelation matrix IACM1 may be represented as shown in Equation 8 below.

[Equation 8]

$$k_{L,m,k} = \frac{\Psi_{L,m-1,k}\,u_{L,m,k}}{\gamma_{L,k}\bar{\lambda}_Z[m,k] + u^H_{L,m,k}\Psi_{L,m-1,k}u_{L,m,k}}$$

$$\Psi_{L,m,k} = \gamma^{-1}_{L,k}(\Psi_{L,m-1,k} - k_{L,m,k}u^H_{L,m,k}\Psi_{L,m-1,k})$$

$$g_{L,m,k} = g_{L,m-1,k} + k_{L,m,k}\bar{Y}^*[m,k]$$

Here, $\gamma_{L,k}$ is the first forgetting factor (FF1), $\psi_{L,m,k}$ and $\gamma_{L,k}{}^{-1}$ may be included in the first inverse autocorrelation matrix IACM1. The first forgetting factor may be a constant or be determined based on the first estimated output signal.

Figure 7:
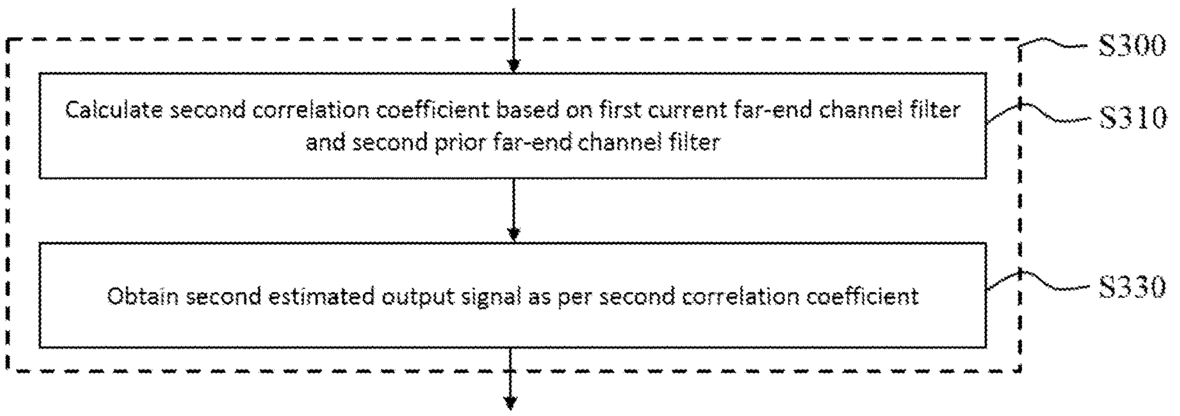
FIG. 7 is a flowchart illustrating an example of providing a second estimated output signal according to an embodiment.

FIG. 7 is a flowchart illustrating an example of providing a second estimated output signal according to an embodiment.

Referring to FIG. 7, providing a second estimated output signal EO_S2 may include calculating a second correlation coefficient or power ratio based on a first prior far-end channel filter CFE_F1 and a second prior far-end channel filter PFE_F2 (S310).

The second correlation coefficient or power ratio may be expressed as $\tilde{\rho}$[m,k] and be represented as shown in Equation 9.

[Equation 9]

$$\tilde{\rho}[m,k] = \frac{|\tilde{\Phi}_{LR}[m,k]|}{\sqrt{\tilde{\Phi}_L[m,k]\Phi_R[m,k]}}$$

$$\tilde{\Phi}_L[m,k] = \alpha_\phi\Phi_L[m-1,k] + (1-\alpha_\phi)(g^H_{L,m,k}u_{L,m,k})^H(g^H_{L,m,k}u_{L,m,k})$$

$$\tilde{\Phi}_{LR}[m,k] = \alpha_\phi\Phi_{LR}[m-1,k] + (1-\alpha_\phi)(g^H_{L,m,k}u_{L,m,k})^H(g^H_{R,m-1,k}u_{R,m,k})$$

$$\bar{\rho}[m,k] = \frac{2|\tilde{\Phi}_{LR}[m,k]|}{\tilde{\Phi}_L[m,k]+\Phi_R[m,k]}$$

$g_{L,m-1,k}{}^H$ may denote the first prior far-end channel filter PFE_F1, $g_{L,m,k}{}^H$ may denote the first current far-end channel filter CFE_F1, $u_{L,m,k}$ may denote the first far-end signal FE_S1, $g_{R,m-1,k}{}^H$ may denote the second prior far-end channel filter PFE_F2, $u_{R,m,k}$ may denote the second far-end signal FE_S2, $\alpha_0$ may denote the first weight, m may denote the frame index, and k may denote the frequency index.

A second estimated output signal EO_S2 may be calculated according to the second correlation coefficient or power ratio (S330). For example, the second estimated output signal EO_S2 may be represented as shown in Equation 3.

Figure 8:
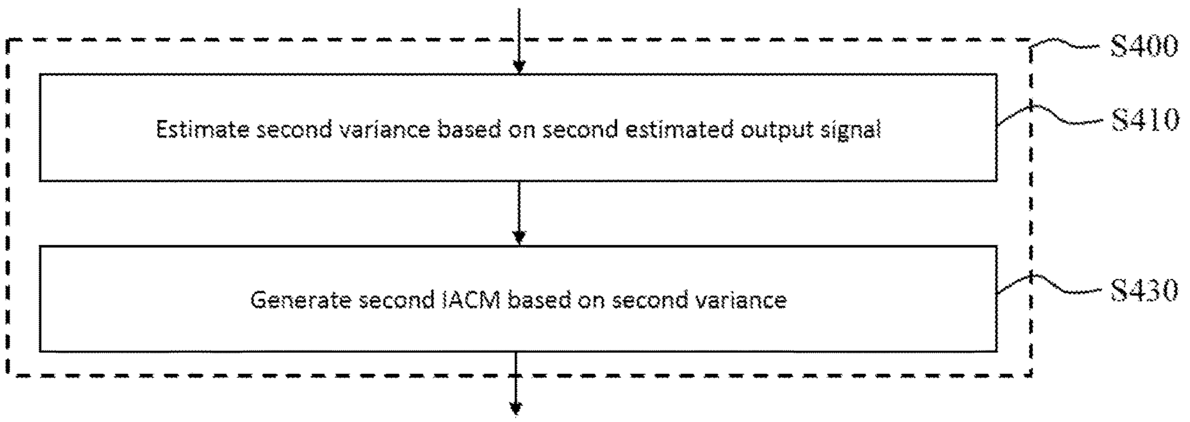
FIG. 8 is a flowchart illustrating an example of updating a second current far-end channel filter according to an embodiment.
Figure 9:
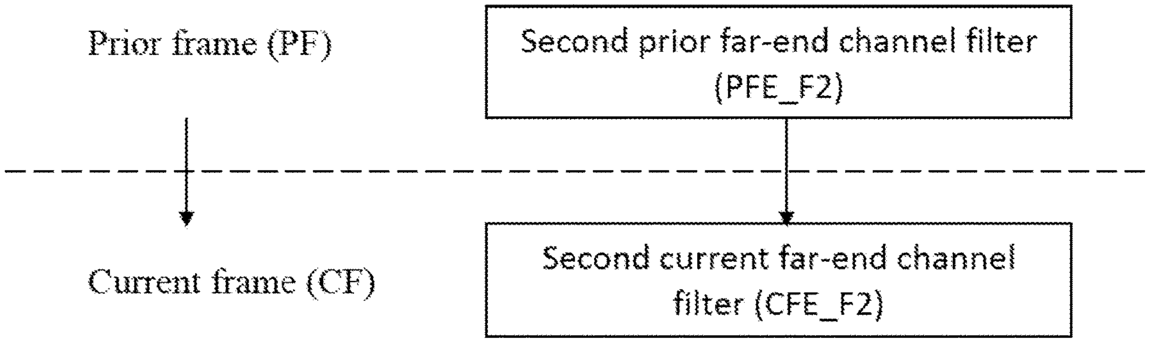
FIG. 9 is a view illustrating a second far-end channel filter varying according to frames.
Figure 10:
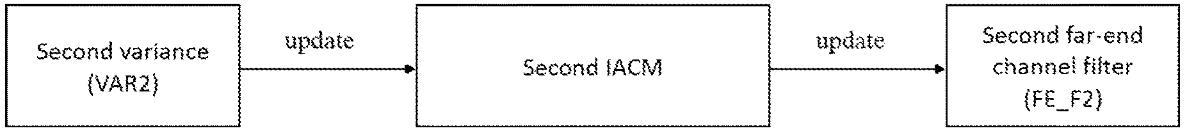
FIG. 10 is a view illustrating a second far-end channel filter according to an embodiment.

FIG. 8 is a flowchart illustrating an example of updating a second current far-end channel filter CFE_F2 according to an embodiment. FIG. 9 is a view illustrating a second far-end channel filter varying according to frames. FIG. 10 is a view illustrating a second far-end channel filter according to an embodiment.

Referring to FIGS. 8 to 10, updating the second current far-end channel filter CFE_F2 may include estimating a second variance VAR2 based on the second estimated output signal EO_S2 (S410).

For example, the second variance VAR2 may be $\tilde{\lambda}_Z$[m,k] and may be represented as shown in Equation 10.

$$\tilde{\lambda}_Z[m,k]=w_Z\bar{\lambda}_Z[m,k]+(1-w_Z)|\tilde{Y}[m,k]|^2 \quad \text{[Equation 10]}$$

Here, $\bar{\lambda}_Z$[m,k] may denote the first variance VAR1, $w_Z$ may denote a second weight arbitrarily determined, and $\tilde{Y}$[m,k] may denote the second estimated output signal EO_S2.

The second variance VAR2 may be determined by the second estimated output signal EO_S2 provided based on the first current far-end channel filter CFE_F1 and the second prior far-end channel filter PFE_F2.

A second inverse autocorrelation matrix IACM2 may be yielded based on the second variance VAR2 (S430).

For example, the second inverse autocorrelation matrix IACM2 may be represented as shown in Equation 11 below.

[Equation 11]

$$k_{R,m,k} = \frac{\Psi_{R,m-1,k}u_{R,m,k}}{\gamma_{R,k}\tilde{\lambda}_Z[m,k] + u^H_{R,m,k}\Psi_{R,m-1,k}u_{R,m,k}}$$

$$\Psi_{R,m,k} = \gamma^{-1}_{R,k}(\Psi_{R,m-1,k} - k_{R,m,k}u^H_{R,m,k}\Psi_{R,m-1,k})$$

$$g_{R,m,k} = g_{R,m-1,k} + k_{R,m,k}\tilde{Y}^*[m,k]$$

Here, $\gamma_{R,k}$ denotes the second forgetting factor (FF2), and $\psi_{R,m,k}$ and $\gamma_{R,k}^{-1}$ may be included in the second inverse autocorrelation matrix IACM2. The second forgetting factor may be a constant or be determined based on the second estimated output signal.

Figure 11:
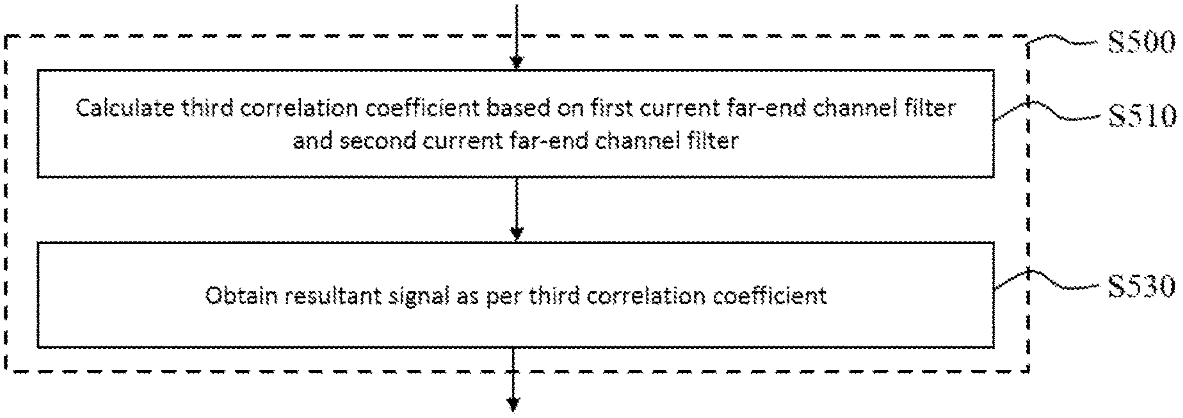
FIG. 11 is a flowchart illustrating an example of providing a result signal according to an embodiment.

FIG. 11 is a flowchart illustrating an example of providing a result signal according to an embodiment.

Referring to FIG. 11, providing a resultant signal OUT_S may include calculating a third correlation coefficient or power ratio based on a first current far-end channel filter CFE_F1 and a second current far-end channel filter CFE_F2 (S510).

The third correlation coefficient or power ratio may be expressed as ρ[m,k] and be represented as shown in Equation 12.

[Equation 12]

$$\rho[m,k] = \frac{|\Phi_{LR}[m,k]|}{\sqrt{\Phi_L[m,k]\Phi_R[m,k]}}$$

$$\Phi_L[m,k] = \alpha_\phi\Phi_L[m-1,k] + (1-\alpha_\phi)(g^H_{L,m,k}u_{L,m,k})^H(g^H_{L,m,k}u_{L,m,k})$$

$$\Phi_R[m,k] = \alpha_\phi\Phi_R[m-1,k] + (1-\alpha_\phi)(g^H_{R,m,k}u_{R,m,k})^H(g^H_{R,m,k}u_{R,m,k})$$

$$\Phi_{LR}[m,k] = \alpha_\phi\Phi_{LR}[m-1,k] + (1-\alpha_\phi)(g^H_{L,m,k}u_{L,m,k})^H(g^H_{R,m,k}u_{R,m,k})$$

$$\rho[m,k] = \frac{2|\Phi_{LR}[m,k]|}{\Phi_L[m,k] + \Phi_R[m,k]}$$

$g_{L,m,k}^H$ may denote the first current far-end channel filter CFE_F1, $u_{L,m,k}$ may denote the first far-end signal FE_S1, $g_{R,m,k}^H$ may denote the second current far-end channel filter CFE_F2, $u_{R,m,k}$ may denote the second far-end signal FE_S2, $\alpha_0$ may denote the first weight, m may denote the frame index, and k may denote the frequency index.

The resultant signal OUT_S may be calculated according to the third correlation coefficient or power ratio. For example, the resultant signal OUT_S may be represented as shown in Equation 5.

Figure 12:
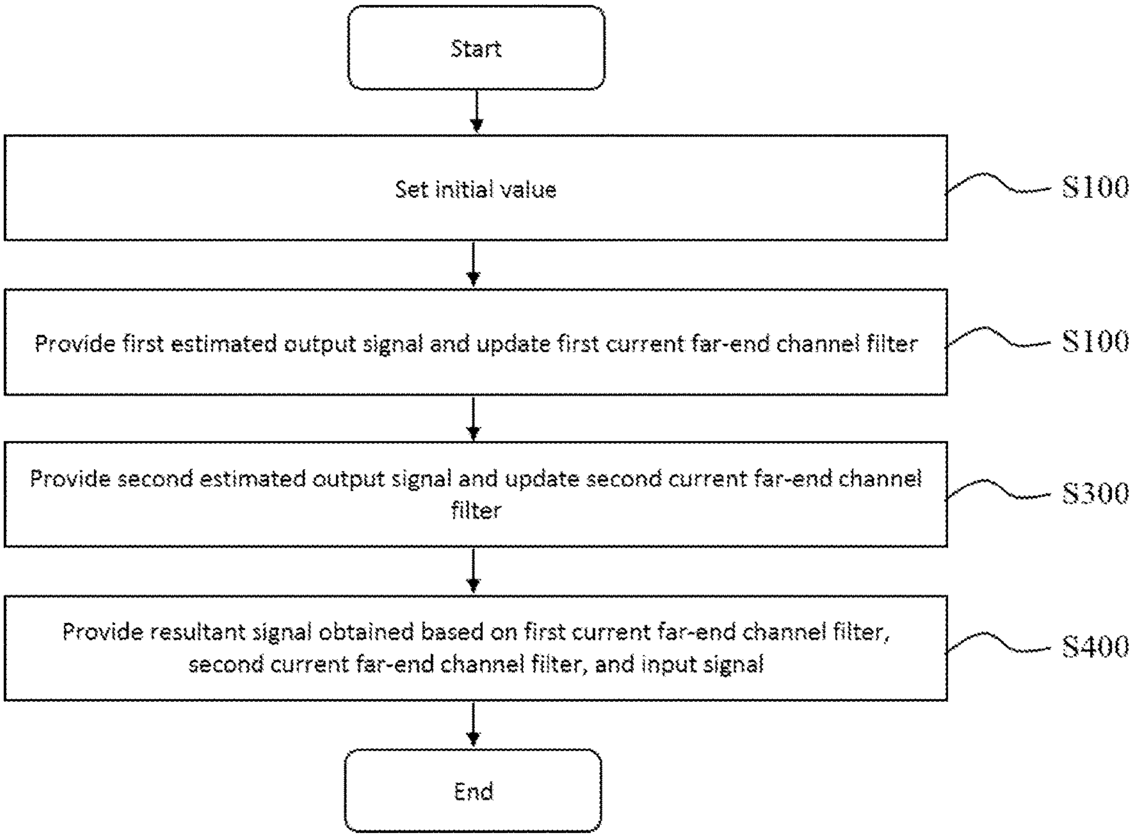
FIG. 12 is a flowchart illustrating a stereo noise cancellation method according to an embodiment.

FIG. 12 is a flowchart illustrating a stereo noise cancellation method according to an embodiment.

Referring to FIG. 12, according to an embodiment, the stereo noise cancellation method may include setting an initial value (S100). A first estimated output signal EO_S1 may be calculated and provided based on an input signal IN_S and a first prior far-end channel filter PFE_F1 and a second prior far-end channel filter PFE_F2 corresponding to a prior frame PF, and a first current far-end channel filter CFE_F1 corresponding to a current frame CF may be updated according to the first estimated output signal EO_S1 and the first prior far-end channel filter PFE_F1 (S200). A second estimated output signal EO_S2 may be calculated and provided based on the input signal IN_S, the first current far-end channel filter CFE_F1, and the second prior far-end channel filter PFE_F2, and a second current far-end channel filter CFE_F2 corresponding to the current frame CF may be updated according to the second estimated output signal EO_S2 and the second prior far-end channel filter PFE_F2 (S300). A resultant signal OUT_S may be obtained and provided based on the first current far-end channel filter CFE_F1, the second current far-end channel filter CFE_F2, and the input signal IN_S (S400).

According to an embodiment, updating the first current far-end channel filter CFE_F1 may include calculating a first correlation coefficient or power ratio based on the first prior far-end channel filter PFE_F1 and the second prior far-end channel filter PFE_F2. The first estimated output signal EO_S1 may be calculated according to the first correlation coefficient or power ratio. A first variance VAR1 of the first estimated output signal EO_S1 may be estimated. A first inverse autocorrelation matrix IACM1 may be yielded based on the first variance VAR1.

According to an embodiment, updating the second current far-end channel filter CFE_F2 may include calculating a second correlation coefficient or power ratio based on the first current far-end channel filter CFE_F1 and the second prior far-end channel filter PFE_F2. The second estimated output signal EO_S2 may be calculated according to the second correlation coefficient or power ratio. A second variance VAR2 of the second estimated output signal EO_S2 may be estimated. A second inverse autocorrelation matrix IACM2 may be yielded based on the second variance VAR2.

According to an embodiment, the noise cancellation method may remove stereo echo signals from the input signal IN_S, providing noise-free voice signals.

Figure 13:
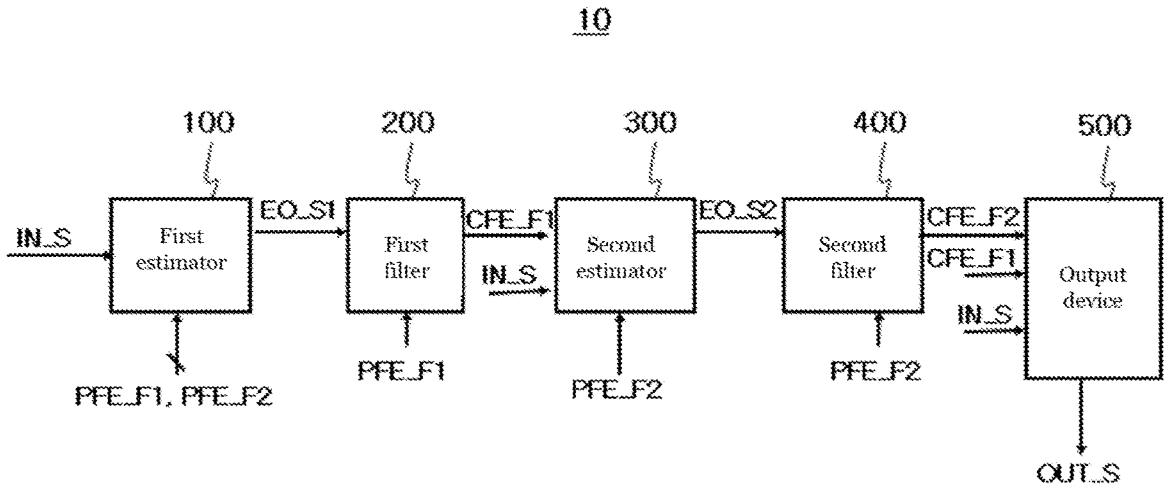
FIG. 13 is a view illustrating a noise cancellation device according to an embodiment.

FIG. 13 is a view illustrating a noise cancellation device according to an embodiment.

Referring to FIG. 13, a noise cancellation device 10 may include a first estimator 100, a first filter 200, a second estimator 300, a second filter 400, and an output device 500.

The first estimator 100 may be an estimation circuit or circuitry. The first filter 200 may be a filter circuit or circuitry. The second estimator 300 may be an estimation circuit or circuitry. The second filter 400 may be a filter circuit or circuitry. The output device 500 may be an output circuit or circuitry.

The first estimator 100 may provide a first estimated output signal EO_S1 based on a first prior far-end channel filter PFE_F1 and a second prior far-end channel filter PFE_F2 corresponding to a prior frame PF, and an input signal IN_S. The first filter 200 may update a first current far-end channel filter CFE_F1 corresponding to a current frame CF according to the first estimated output signal EO_S1 and the first prior far-end channel filter PFE_F1.

The second estimator 300 may provide a second estimated output signal EO_S2 based on the first current far-end channel filter CFE_F1, the second prior far-end channel filter PFE_F2, and the input signal IN_S. The second filter 400 may update a second current far-end channel filter CFE_F2 corresponding to the current frame CF according to the second estimated output signal EO_S2 and the second prior far-end channel filter PFE_F2.

The output device 500 may provide a resultant signal OUT_S based on the first current far-end channel filter CFE_F1, the second current far-end channel filter CFE_F2, and the input signal IN_S.

According to an embodiment, the first estimated output signal EO_S1 may be yielded according to a first correlation coefficient or power ratio calculated based on the first prior far-end channel filter PFE_F1 and the second prior far-end channel filter PFE_F2.

Figure 14:
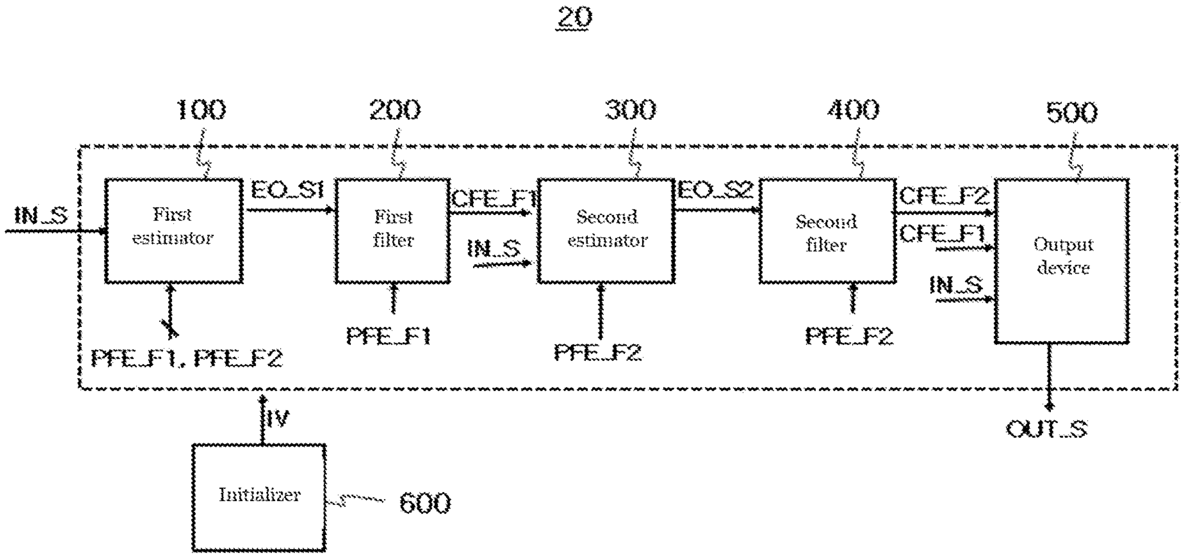
FIG. 14 is a view illustrating a stereo noise cancellation device according to an embodiment.

FIG. 14 is a view illustrating a stereo noise cancellation device according to an embodiment.

Referring to FIG. 14, a noise cancellation device 20 may include an include an initializer 600, a first estimator 100, a first filter 200, a second estimator 300, a second filter 400, and an output device 500.

The initializer 600 may be an initializing circuit or circuitry. The first estimator 100 may be an estimation circuit or circuitry. The first filter 200 may be a filter circuit or circuitry. The second estimator 300 may be an estimation circuit or circuitry. The second filter 400 may be a filter circuit or circuitry. The output device 500 may be an output circuit or circuitry.

The initializer 600 may set initial values. The initial values set by the initializer 600 may include initial values IV of a first variance VAR1 and a second variance VAR2. The first estimator 100 may provide a first estimated output signal EO_S1 based on a first prior far-end channel filter PFE_F1 and a second prior far-end channel filter PFE_F2 corresponding to a prior frame PF, and an input signal IN_S. The first filter 200 may update a first current far-end channel filter CFE_F1 corresponding to a current frame CF according to the first estimated output signal EO_S1 and the first prior far-end channel filter PFE_F1.

The second estimator 300 may provide a second estimated output signal EO_S2 based on the first current far-end channel filter CFE_F1, the second prior far-end channel filter PFE_F2, and the input signal IN_S. The second filter 400 may update a second current far-end channel filter CFE_F2 corresponding to the current frame CF according to the second estimated output signal EO_S2 and the second prior far-end channel filter PFE_F2.

The output device 500 may provide a resultant signal OUT_S based on the first current far-end channel filter CFE_F1, the second current far-end channel filter CFE_F2, and the input signal IN_S.

According to an embodiment, the second estimated output signal EO_S2 may be yielded according to a second correlation coefficient or power ratio calculated based on the first current far-end channel filter CFE_F1 and the second prior far-end channel filter PFE_F2.

According to an embodiment, the noise cancellation method may remove stereo echo signals from the input signal IN_S, providing noise-free voice signals.

Figure 15:
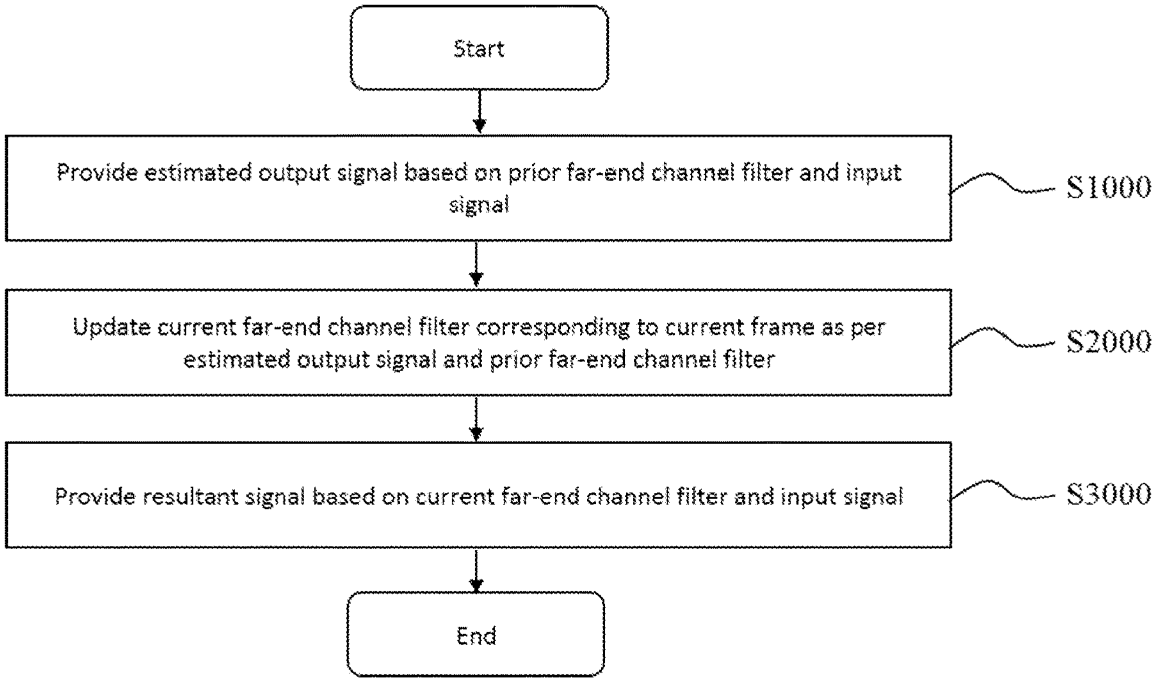
FIG. 15 is a flowchart illustrating a mono noise cancellation method according to an embodiment.
Figure 16:
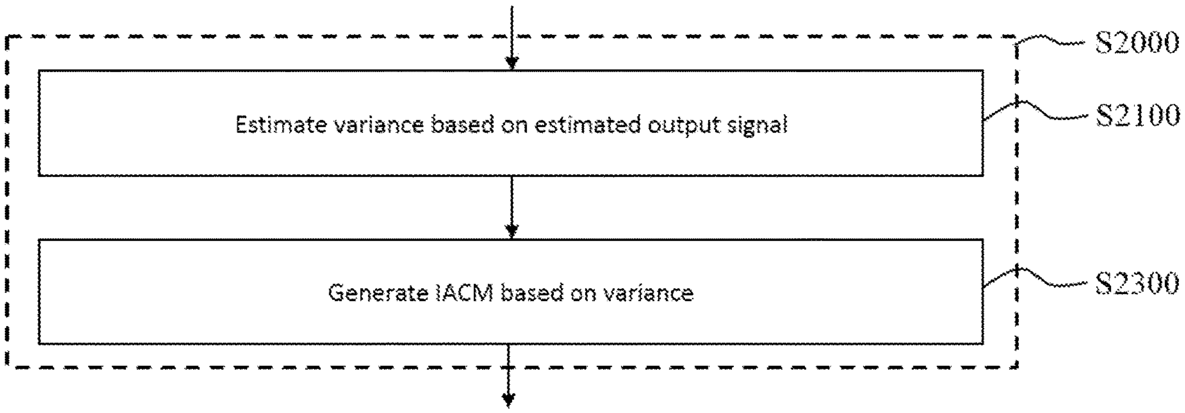
FIG. 16 is a flowchart illustrating an example of updating a current far-end channel filter according to an embodiment.

FIG. 15 is a flowchart illustrating a mono noise cancellation method according to an embodiment. FIG. 16 is a flowchart illustrating an example of updating a current far-end channel filter according to an embodiment.

Referring to FIGS. 1, 15, and 16, the mono echo signal (e.g., noise) cancellation method may correspond or apply where the first far-end signal FE_S1 or the second far-end signal FE_S2 is zero. An estimated output signal EO_S may be obtained and provided based on a far-end channel filter PFE_F and an input signal IN_S (S1000). The input signal IN_S may include a near-end signal NE_S and a far-end signal FE_S. The estimated output signal EO_S may be represented as shown in Equation 13.

$$\overline{Y}[m,k]=X[m,k]-g_{L,m-1,k}{}^{H}u_{L,m,k} \quad \text{[Equation 13]}$$

A current far-end channel filter CFE_F corresponding to the current frame CF may be updated according to the estimated output signal EO_S and the prior far-end channel filter PFE_F (S2000). The current far-end channel filter CFE_F may be represented as shown in Equation 2.

A resultant signal OUT_S may be obtained and provided based on the current far-end channel filter CFE_F1 and the input signal IN_S (S3000).

The resultant signal OUT_S may be represented as shown in Equation 14.

$$Z[m,k]=\overline{Y}[m,k]-g_{L,m,k}{}^{H}u_{L,m,k} \quad \text{[Equation 14]}$$

Updating the current far-end channel filter CFE_F may include estimating a variance VAR based on the estimated output signal EO_S (S2100). An inverse autocorrelation matrix (IACM) may be calculated and yielded based on the variance (S2300).

The mono noise cancellation method described in connection with FIGS. 15 and 16 may apply where the first far-end signal or the second far-end signal is zero in the embodiments described above in connection with FIG. 1. Although the embodiments of the disclosure focus primarily on mono or stereo noise cancellation, the embodiments of the disclosure may also be applicable where there are three or more noise sources.

According to various embodiments of the disclosure, the noise cancellation method may provide noise-free voice signals by removing stereo echo signals from signals input to a microphone.

The noise cancellation device may provide noise-free voice signals by removing stereo echo signals from signals input to a microphone.

The foregoing or other various aspects of the disclosure would be apparent to a skilled artisan from the following detailed description.

The noise cancellation device according to various embodiments may be one of various types of electronic devices including, but not limited to, at least one of, e.g., a portable communication device (e.g., a smartphone), a computer device, a portable multimedia device, a portable medical device, a camera, a wearable device, or a home appliance. It should be appreciated that various embodiments of the disclosure and the terms used therein are not intended to limit the techniques set forth herein to particular embodiments and that various changes, equivalents, and/or replacements therefor also fall within the scope of the disclosure.

As used herein, the term “A or B,” “at least one of A and/or B,” “A, B, or C,” or “at least one of A, B, and/or C” may include all possible combinations of the enumerated items. As used herein, the terms “1st” or “first” and “2nd” or “second” may modify corresponding components regardless of importance and/or order and are used to distinguish a component from another without limiting the components.

As used herein, the term “module” includes a unit configured in hardware, software, or firmware and may interchangeably be used with other terms, e.g., “logic,” “logic block,” “part,” “circuit,” or “device.” A module may be a single integral part or a minimum unit or part for performing one or more functions. For example, the module may be configured in an application-specific integrated circuit (ASIC).

Various embodiments as set forth herein may be implemented as software including one or more instructions that are stored in a machine-readable or computer-readable storage medium (e.g., a transitory memory or a non-transitory memory) that is readable by a machine (e.g., the noise cancellation device) or a processor.

For example, a processor of the noise cancellation device may invoke at least one of the one or more instructions stored in the storage medium, and execute it, with or without using one or more other components under the control of the processor. This allows the noise cancellation device to be operated to perform at least one function according to the at least one instruction invoked. The one or more instructions may include a code generated by a complier or a code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Although the disclosure has been shown and described in connection with exemplary embodiments thereof, it will be appreciated by one of ordinary skill in the art that various changes or modifications may be made thereto without departing from the scope of the disclosure.

What is claimed is:

1. A method of noise cancellation, the method comprising:

providing a first estimated output signal based on an input signal and a first prior far-end channel filter corresponding to a prior frame;

updating a first current far-end channel filter corresponding to a current frame according to the first estimated output signal and the first prior far-end channel filter; and providing a second estimated output signal, as a resultant signal, based on the input signal and the first current far-end channel filter, wherein providing the first estimated output signal includes providing the first estimated output signal based on the input signal and the first prior far-end channel filter and a second prior far-end channel filter corresponding to the prior frame, and providing the second estimated output signal includes providing the second estimated output signal based on the input signal, the first current far-end channel filter, and the second prior far-end channel filter, and wherein the method further comprises:

updating a second current far-end channel filter corresponding to the current frame according to the second estimated output signal and the second prior far-end channel filter; and providing the resultant signal based on the input signal, the first current far-end channel filter, and the second current far-end channel filter.

2. The method of claim 1, wherein providing the first estimated output signal includes calculating a first correlation coefficient or a power ratio based on the first prior far-end channel filter and the second prior far-end channel filter and obtaining the first estimated output signal according to the first correlation coefficient or the power ratio.

3. The method of claim 2, wherein updating the first current far-end channel filter includes estimating a first variance based on the first estimated output signal, generating a first inverse autocorrelation matrix (IACM) calculated based on the first variance, and calculating a first forgetting factor based on the first estimated output signal.

4. The method of claim 3, wherein the first forgetting factor is a constant or is determined based on the first estimated output signal.

5. The method of claim 3, wherein the first variance is determined by the first estimated output signal provided based on the first prior far-end channel filter and the second prior far-end channel filter.

6. The method of claim 5, wherein updating the second current far-end channel filter includes estimating a second variance based on the second estimated output signal, generating a second IACM calculated based on the second variance, and calculating a second forgetting factor based on the second estimated output signal.

7. The method of claim 6, wherein the second forgetting factor is a constant or is determined based on the second estimated output signal.

8. The method of claim 1, wherein providing the second estimated output signal includes calculating a second correlation coefficient or a power ratio based on the first current far-end channel filter and the second prior far-end channel filter and obtaining the second estimated output signal according to the second correlation coefficient or the power ratio.

9. The method of claim 8, wherein the second variance is determined by the second estimated output signal provided based on the first current far-end channel filter and the second prior far-end channel filter.

10. The method of claim 9, wherein updating the first current far-end channel filter includes calculating a first correlation coefficient or a power ratio based on the first prior far-end channel filter and the second prior far-end channel filter, obtaining the first estimated output signal according to the first correlation coefficient or the power ratio, estimating a first variance of the first estimated output signal, and generating a first IACM calculated based on the first variance.

11. The method of claim 9, wherein updating the second current far-end channel filter includes calculating a second correlation coefficient or a power ratio based on the first current far-end channel filter and the second prior far-end channel filter, obtaining the second estimated output signal according to the second correlation coefficient or the power ratio, estimating a second variance of the second estimated output signal, and generating a second IACM calculated based on the second variance.

12. The method of claim 1, wherein providing the resultant signal includes calculating a third correlation coefficient or a power ratio based on the first current far-end channel filter and the second current far-end channel filter and obtaining the resultant signal according to the third correlation coefficient or the power ratio.

13. A method of stereo noise cancellation, the method comprising:

setting an initial value;

providing a first estimated output signal based on an input signal and a first prior far-end channel filter and a second prior far-end channel filter corresponding to a prior frame;

updating a first current far-end channel filter corresponding to a current frame according to the first estimated output signal and the first prior far-end channel filter;

providing a second estimated output signal based on the first current far-end channel filter, the second prior far-end channel filter, and the input signal;

updating a second current far-end channel filter corresponding to the current frame according to the second estimated output signal and the second prior far-end channel filter; and providing a resultant signal based on the input signal, the first current far-end channel filter, and the second current far-end channel filter.

14. A device of noise cancellation, comprising:

a first estimator configured to provide a first estimated output signal based on an input signal and a first prior far-end channel filter and a second prior far-end channel filter corresponding to a prior frame;

a first filter configured to update a first current far-end channel filter corresponding to a current frame according to the first estimated output signal and the first prior far-end channel filter;

a second estimator configured to provide a second estimated output signal based on the input signal, the first current far-end channel filter, and the second prior far-end channel filter;

a second filter configured to update a second current far-end channel filter corresponding to the current frame according to the second estimated output signal and the second prior far-end channel filter; and an output device configured to provide a resultant signal based on the input signal, the first current far-end channel filter, and the second current far-end channel filter.

15. The device of claim 14, wherein the first estimated output signal is obtained according to a first correlation coefficient or a power ratio calculated based on the first prior far-end channel filter and the second prior far-end channel filter.

16. The device of claim 14, further comprising an initializer configured to set an initial value.

17. The device of claim 14, wherein the second estimated output signal is obtained according to a second correlation coefficient or a power ratio calculated based on the first current far-end channel filter and the second prior far-end channel filter.

* * * * *